US008954563B2

(12) United States Patent
Scarpelli et al.

(10) Patent No.: US 8,954,563 B2
(45) Date of Patent: Feb. 10, 2015

(54) EVENT ENRICHMENT USING DATA CORRELATION

(75) Inventors: Joseph A. Scarpelli, Mountainview, CA (US); Sridhar Sodem, Cupertino, CA (US)

(73) Assignee: BMC Software, Inc., Houston, TX (US)

( * ) Notice: Subject to any disclaimer, the term of this patent is extended or adjusted under 35 U.S.C. 154(b) by 1016 days.

(21) Appl. No.: 12/752,951

(22) Filed: Apr. 1, 2010

(65) Prior Publication Data

US 2011/0246585 A1    Oct. 6, 2011

(51) Int. Cl.
*G06F 15/16*    (2006.01)
*G06F 15/173*    (2006.01)
*G06F 11/34*    (2006.01)

(52) U.S. Cl.
CPC ........ *G06F 11/3447* (2013.01); *G06F 11/3409* (2013.01); *G06F 11/3452* (2013.01); *G06F 2201/815* (2013.01); *G06F 2201/86* (2013.01); *G06F 11/3495* (2013.01); *G06F 2201/81* (2013.01)
USPC ............ 709/224; 709/206; 709/223; 709/226

(58) Field of Classification Search
USPC .................................. 709/206, 223, 224, 246
See application file for complete search history.

(56) References Cited

U.S. PATENT DOCUMENTS

| | | | | |
|---|---|---|---|---|
| 6,643,613 | B2 * | 11/2003 | McGee et al. | 702/186 |
| 6,694,288 | B2 * | 2/2004 | Smocha et al. | 702/186 |
| 7,392,314 | B2 * | 6/2008 | Betzler et al. | 709/226 |
| 7,568,019 | B1 * | 7/2009 | Bhargava et al. | 709/223 |
| 7,610,371 | B2 * | 10/2009 | Enqvist | 709/224 |
| 8,103,774 | B2 * | 1/2012 | Betzler et al. | 709/226 |
| 8,230,051 | B1 * | 7/2012 | Zahavi et al. | 709/223 |
| 2003/0110007 | A1 * | 6/2003 | McGee et al. | 702/179 |
| 2005/0055696 | A1 * | 3/2005 | Betzler et al. | 718/100 |
| 2007/0168505 | A1 * | 7/2007 | Devadoss et al. | 709/224 |
| 2007/0208851 | A1 * | 9/2007 | Unkenholz et al. | 709/224 |
| 2008/0046266 | A1 * | 2/2008 | Gudipalley et al. | 705/1 |

OTHER PUBLICATIONS

Monolith Data Sheet; "Event Enrichment & Correlation;" Jun. 16, 2009; retrieved from URL: http://www.monolith-software.com/public/datasheets/event-enrichment-correlation-software.pdf.

* cited by examiner

*Primary Examiner* — Edward Kim

(57) ABSTRACT

Systems and methods for enriching events using data correlation are described herein. At least some embodiments include a method for enriching events reflecting the state of a plurality of computer systems, the method including storing a plurality of event messages and system metric data that includes service metric data, determining a degree of correlation between a system metric and at least one of a plurality of service metrics, and enriching an event message of the plurality of event messages based at least in part on the degree of correlation. At least one system metric data value triggers the event message. The degree of correlation is based at least in part on the system metric data and the service metric data.

17 Claims, 4 Drawing Sheets

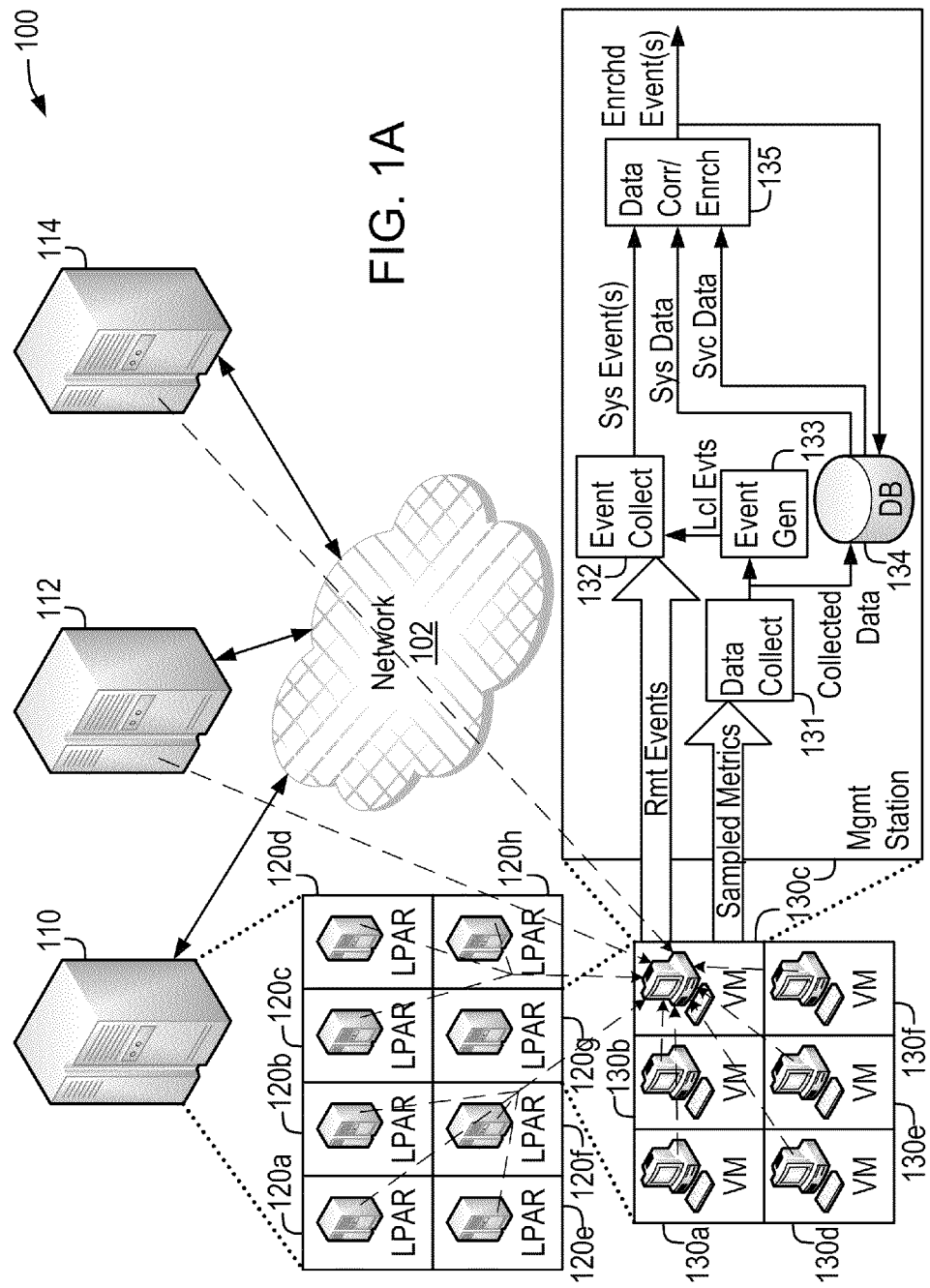

EVENT ENRICHMENT USING DATA CORRELATION

BACKGROUND

This disclosure relates generally to systems and methods for enriching events generated by a computer system. As both the size and rate of growth of computer systems have increased, more and more application service providers (ASPs) are opting to outsource their computer infrastructure. As a result, today's datacenters house very large numbers of real and virtual servers for numerous ASPs. These servers must all be monitored and dynamically reconfigured to meet the constantly changing demand for the services provided. Such monitoring and reconfigurability is necessary in order to ensure that ASPs hosted within a datacenter are provided the levels of service guaranteed by the datacenter under one or more service level agreements (SLAs). Such agreements establish levels of service that the datacenter must provide to an ASP, which are generally defined in terms of system level objectives (SLOs) or service metrics.

With servers within a single datacenter numbering in the thousands, if not the tens of thousands, monitoring system metrics and related events can be a daunting task. While event prioritizing may help datacenter operators with the task of sorting events and determining a course of action, more sophisticated systems provide additional processing of events in order to reduce the number of events presented to operators while increasing the specificity of the information provided. For example, in some existing systems events are correlated to other events in order to help identify the root cause of a cluster of what may seem like several disparate events. At least some of these systems use computed correlation coefficients to set or modify attributes within an event message (e.g., the priority value of the event).

Such systems, however, may still overwhelm operators with large numbers of event messages that are not sufficiently specific to diagnose a problem. Also, many such systems require the additional overhead of creating and maintaining service models that mirror the datacenter components and their relationships as part of the processing and prioritizing/re-prioritizing of events. These systems use such service models to provide pre-defined dependencies between system components that are relied upon to identify which events to test for correlations.

SUMMARY

Systems and methods for enriching events using data correlation are described herein. At least some embodiments include a method for enriching events reflecting the state of a plurality of computer systems, the method including storing a plurality of event messages and system metric data that includes service metric data, determining a degree of correlation between a system metric and at least one of a plurality of service metrics, and enriching an event message of the plurality of event messages based at least in part on the degree of correlation. At least one system metric data value triggers the event message. The degree of correlation is based at least in part on the system metric data and the service metric data. Other embodiments include a computer-readable storage medium that includes software that can be executed on a processor to cause the processor to perform the above-described method.

Still other embodiments include a networked computer system that includes a communication network and a plurality of computer systems each coupled to the communication network. At least one computer system of the plurality of computer systems includes a storage device that stores a plurality of event messages and system metric data that comprises service metric data, as well as a processing unit that determines a degree of correlation between a system metric and at least one of a plurality of service metrics. The processing unit enriches an event message of the plurality of event messages based at least in part on the degree of correlation. At least one system metric data value triggers the event message. The degree of correlation is based at least in part on the system metric data and the service metric data.

BRIEF DESCRIPTION OF THE DRAWINGS

FIG. 1A illustrates an example system that enriches events using data correlation.

DETAILED DESCRIPTION

Figure 1B:
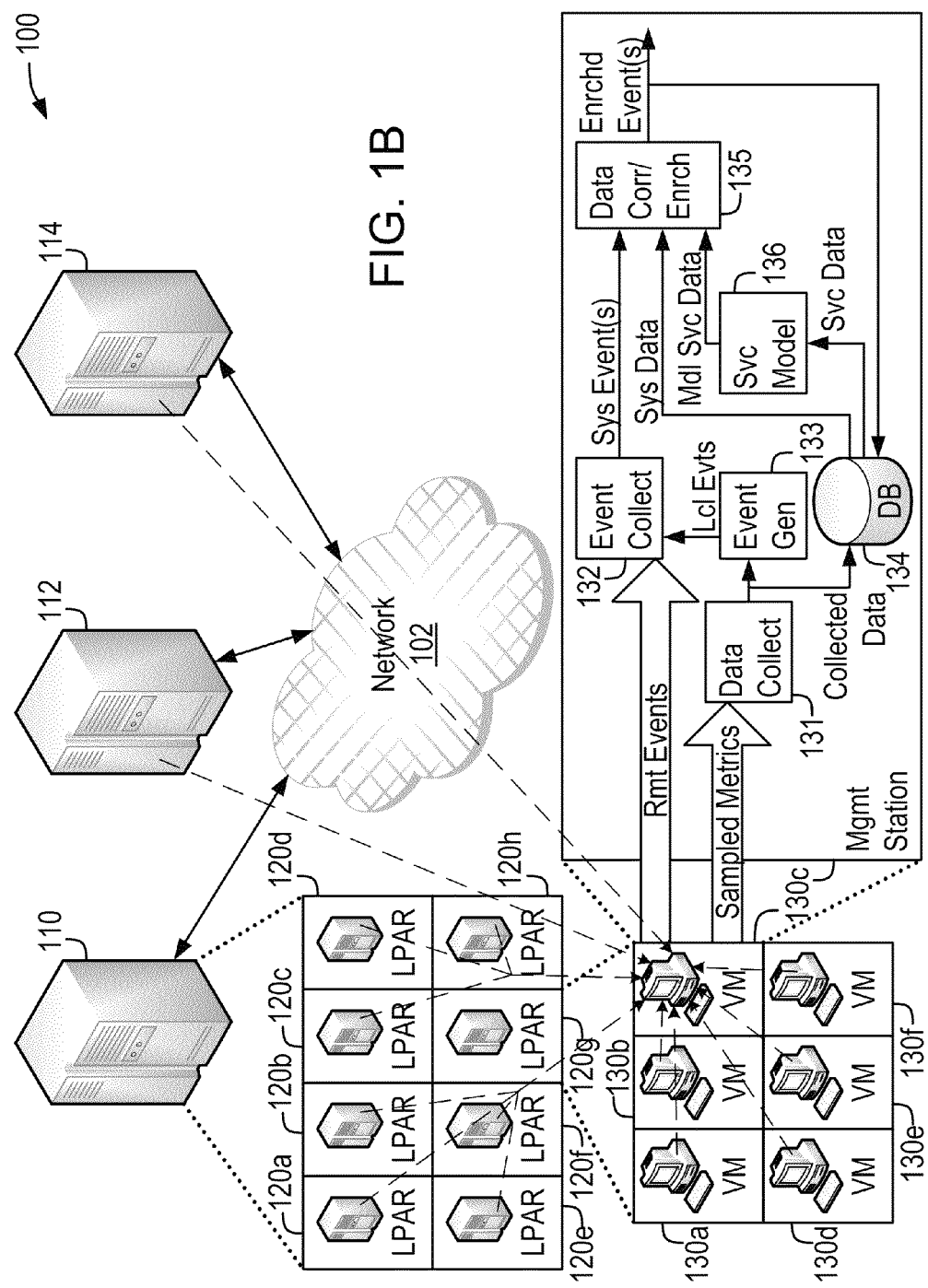
FIG. 1B illustrates an alternative embodiment of the example of FIG. 1A that further incorporates a service model.

The present disclosure describes systems and methods for enriching events produced by a computer system using data correlation. Data enrichment is a process whereby existing data is modified and/or augmented before being provided by one component to another component within a system. Such components may include hardware components such as real and virtual computer systems, as well as software components such as operating system elements and application programs executing on said computer systems. Within the context of event messages, an event message is received by a system component and, in accordance with at least some embodiments, is augmented (e.g., by adding information identifying data correlated to the event), modified (e.g., by modifying an existing priority value within the event message based upon data correlated to the event) or both. The enriched event message is then forwarded by the receiving component to other system components (e.g., an alarm and event processing subsystem).

In at least some embodiments, the event message enrichment is based at least in part on a computation that determines the correlation between a system metric (described below) associated with a system component that triggered the event (and the resulting event message) and another system metric also associated with a system component. Such system metrics include values that each represents a performance indicator for a given system component. For example, memory within a datacenter server may be a component that has one or more associated system metrics, such as utilization percentage of the memory. An event indicating that the utilization percentage has exceeded a predefined threshold (e.g., 80%) would be associated with both the memory (the system component) and the utilization percentage (the system metric). This association enables data samples of the system metric near the time of the event (before and/or after) to be identified and used to correlate the system metric, associated with the event triggering component, to other system metrics (and by implication to other corresponding components).

As already noted, a service level agreement (SLA) between a datacenter operator and an application service provider (ASP) defines the level of service that must be provided in terms of service level objectives (SLO). These SLOs represent specific system metrics that can be measured for compliance with the SLA. Throughout the present disclosure, this subset of specific system metrics is referred to as "service metrics." In at least some embodiments, each service metric corresponds to an SLO defined within an SLA. Such service metrics may include, for example number of active users, transaction throughput, transaction response times and overall system availability. Each of these metrics may be further specified as minimum, maximum and average values, just to name a few examples.

FIG. 1A illustrates a system 100, constructed in accordance with at least some embodiments. System 100 includes mainframe computer systems 110, 112 and 114, each of which represents a potential source of event messages and system metric data. System metrics may include, for example, available network bandwidth, processing throughput and utilization, available memory and storage space and number of available partitions and virtual machines. Event messages may include, for example, notifications triggered when one or more system metrics conform to an event criterion such as a system metrics value exceeding a threshold (e.g., available memory dropping below a pre-defined level) or when several system metrics indicate that several events have occurred within a window of time or in a specific sequence (e.g., multiple data access failures possibly indicating a failed or soon to fail disk drive). Those of ordinary skill in the art will recognize that the embodiments described herein can incorporate many other system metrics and events, and all such system metrics and events are contemplated by the present disclosure.

Mainframe 110 shows an example of how each mainframe of FIG. 1A may be subdivided into logical partitions (LPARs) 120a-120h. Each partition may subsequently operate as a host system for one or more guest virtual machines, such as virtual machines (VMs) 130a-130f hosted on logical partition 120g. All of the mainframes, logical partitions and virtual machines each represent a potential source of events and system metric data, which in the example embodiment shown are routed to a single management station. The flow of event messages and system metric data is represented by the dashed arrows originating from the various sources, which are all directed to a management station implemented using virtual machine 130c. Although a virtual machine is used to host the management station function in the example shown, any of a number of real or virtual host machines may be used, and all such host machines are contemplated by the present disclosure.

Continuing to refer to the example of FIG. 1A, remotely generated events (Rmt Events) and sampled system metric data (Sampled Metrics) are respectively received by event collection module (Event Collect) 132 and system metric data collection module (Data Collect) 131. These modules, as well as local event generation module (Event Gen) 133 and data correlation and enrichment module (Data Corr/Enrch) 135, may be implemented within management station 130c in software, hardware or a combination of hardware and software. In at least some embodiments, the system metric data includes unsolicited periodic data samples transmitted by a system component, and may also/alternatively include data samples provided in response to periodic requests issued by data collection module 131. The system components may include any hardware and/or software component within the system of FIG. 1A.

Data collection module 131 forwards the collected system metric data (Collected Data) to database (DB) 134 (e.g., a relational database stored on a hard disk) and also to local event generation module 133. Local event generation module 133 compares at least some of the collected system metric data points against one or more event criteria (e.g., a user-defined set of rules that establishes the conditions under which one or more events are locally generated) and generates an event when appropriate. It should be noted that the terms "local" and "remote" as applied to events in the present disclosure refer to the location where the event is generated, not the location of the underlying event itself. Thus, for example, a "locally" generated event produced by module 133 may in fact reflect a change in a system metric associated with a system component that is external or "remote" to the management station.

Locally generated events (Lcl Evts) are forwarded by local event generation module 133 to event collection module 132, which forwards both locally and remotely generated event messages as system event messages (Sys Event(s)) to data correlation and enrichment module 135. In at least some embodiments, each system event message includes information identifying the system component that generated the event. This information is used by data correlation and enrichment module 135 to identify and read from database 134 stored data for the system metric (Sys Data) associated with the identified system component. In at least some embodiments, a time window around the event occurrence time is used to further delimit the data points read for each system metric identified (e.g., 2-6 hours of data centered around the event time). A similar identification/read operation is performed for data within the time window for each service metric (Svc Data) defined for the system.

For systems that do not incorporate a service model, such as the example system of FIG. 1A, once the system metrics and service metrics have been identified and the corresponding data read, data correlation and enrichment module 135 determines the degree of correlation between each identified system metric and each service metric defined for the system. In at least some embodiments, the degree of correlation is determined by calculating a correlation coefficient, e.g., a Pearson product-moment correlation coefficient or PMCC. Data within the window for a system metric X and for the service metric Y are used to determine the correlation between X and Y. The Pearson PMCC is well known in the art and is not discussed further in the present disclosure. Further, those of ordinary skill will recognize that a wide variety of mathematical techniques and algorithms for determining correlations between two or more variables may be suitable for determining the correlations described herein, and all such techniques and algorithms are contemplated by the present disclosure.

Once calculated, the correlation coefficient may be used to enrich the event message. As previously noted, such enrichment is accomplished by either adding information to the event message, modifying existing information within the event message, or both. For example, the correlation coefficient may be used to set or add a priority value within the event message, or to modify or adjust an existing priority value within the event message, e.g., by increasing the priority value for high correlations. The following is an example of criteria that may be used to automatically set priority values of low, medium and high based upon a calculated correlation coefficient:

Correlation coefficient<=0.3, priority=low
Correlation coefficient>0.3 and <0.7, priority=medium
Correlation coefficient>=0.7, priority=high Similarly, the following is an example of how an existing priority value may be adjusted based upon a calculated correlation coefficient:

Correlation coefficient<=0.3, no change to existing priority
Correlation coefficient>0.3 and <0.7, no change to existing priority Correlation coefficient>=0.7, increase priority by one level Those of ordinary skill in the art will appreciate that other more sophisticated weightings and/or mapping may be applied to the correlation coefficient to set/adjust any of a number of event message attributes, and all such weightings, mappings and attributes are contemplated by the present disclosure.

At least one unexpected result of the above-described event enrichment is the ability to produce events that are automatically enriched with additional information. Thus, for example, information such as the degree of correlation and identifying information for each correlated service metric may be used to further enrich the message before it is presented and acted upon. Such added information allows for more intelligent and better informed real-time decision making or actions, whether performed manually by an operator or automatically by the management station. Also, because the correlation is based upon the underlying metrics rather than the events themselves, a larger sample size of data points is available for the correlation calculations, thus improving the confidence level of the degree of correlation identified using the described embodiments. Further, because the embodiments correlate metrics rather than events, and because the events can include system metrics events triggered before any service events are triggered, the correlation of the metrics can be relied upon as a predictor of a service metric event, thus giving the system and/or operators more time to react to a developing problem.

Because the relationships between system metrics and service metrics are identified empirically in real time, a service model is not needed to practice the systems and methods described herein. Nonetheless, a service model may be incorporated into at least some embodiments to enhance the described functionality. Such a service model describes the relationships between system components and their corresponding system and/or service metrics. This enables the model to identify those components that are affected by changes in other components (e.g., performance changes), and the degree to which they are affected. FIG. 1B illustrates an example system 100 that incorporates such a service model (Svc Model 136). System 100 of FIG. 1B is structurally and functionally the same as system 100 of FIG. 1A, except for the differences noted herein. More specifically, instead of reading from database 134 the data within the time window for all defined service metrics, data correlation and enrichment module 135 issues a request to service model 136 for relevant service metric data within the window. Service model 136 determines which service metrics (Svc Data) are relevant based upon the relationships between components defined within the model (e.g., the 3 service metrics most affected by changes to a specific system metric). Based on this determination, service model 136 reads and forwards to correlation and enrichment 135 only those data points within the window for service metrics associated with the event originating component and with any components identified by service model 136 as dependent upon the event originating component (Mdl Svc Data). In this manner service model 136 operates to reduce the number of correlations performed by reducing the number of service metrics that are correlated to the event generating system metric (as compared to performing correlation calculations for all of the service metrics, as done in the embodiment of FIG. 1A).

Figure 2:
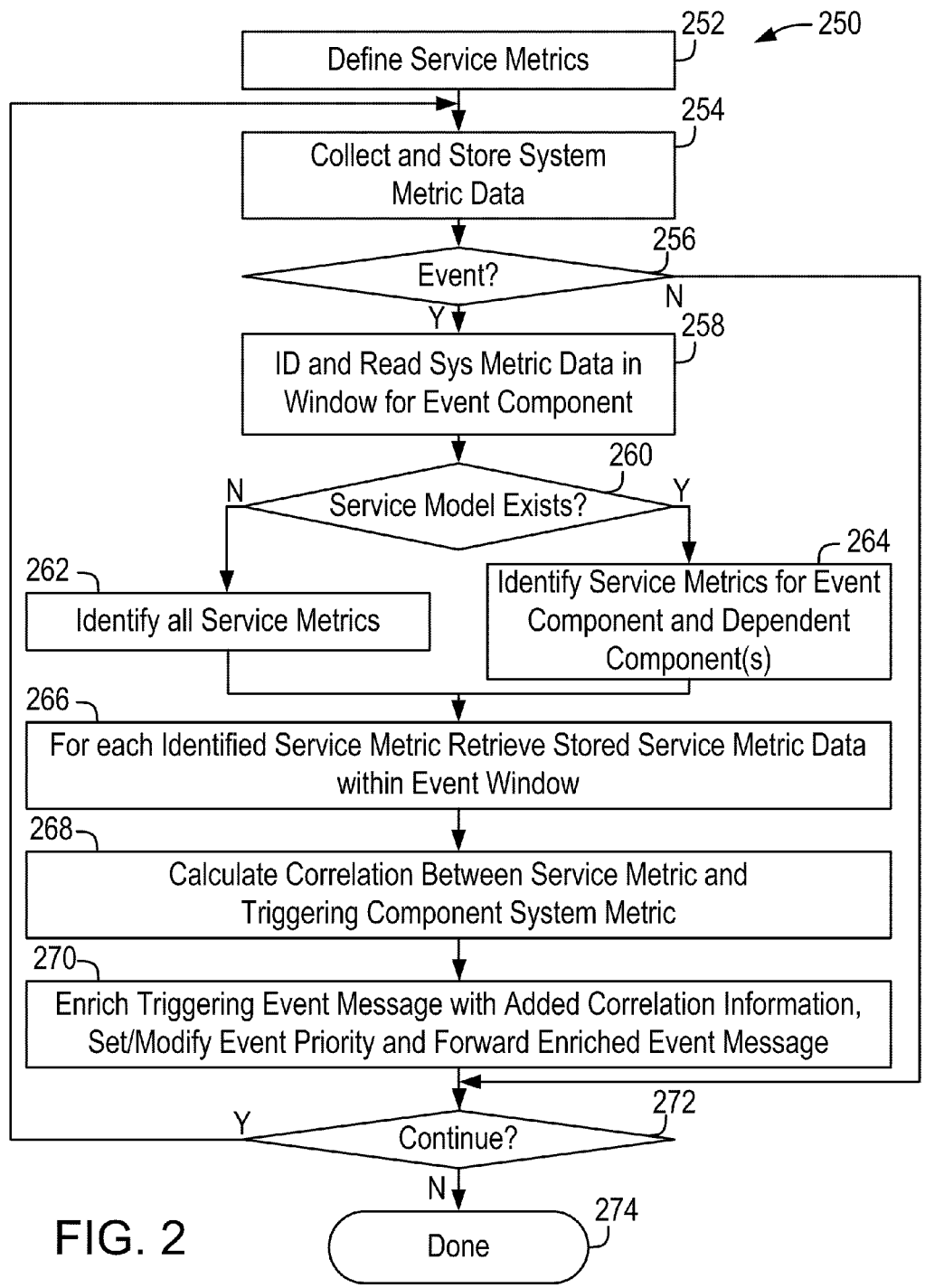
FIG. 2 illustrates an example method for enriching events using data correlation.

FIG. 2 illustrates a flowchart of an example method 250, in accordance with at least some embodiments. Referring to FIGS. 1A, 1B and 2, a set of service metrics are first defined for the system (block 252) based, for example, on service level objectives within a service level agreement. System metric data is then collected (block 254) as previously described. As long as no events are received by, or internally generated within, management workstation 130c (block 256) and the method is not ended (block 272), the data collection of block 254 will continue to be periodically performed. If an event is received or generated (block 256), data for the system metric associated with the event triggering component and within a pre-defined time window is identified and read from database 134 (block 258). If a service model exists (block 260), service model 136 identifies service metrics that are associated with the event triggering component as well as any components that depend upon the event triggering component (block 264). If no service model exists (block 260), all defined service metrics for the system are identified for further processing (block 262). For each identified service metric, the stored service metric data that is within the time window is retrieved from database 134 (block 266).

Once all the system and service metric data has been retrieved, the correlation coefficient is calculated between the event triggering system metric and each identified service metric (block 268). At least some of the correlation-related information (e.g., service metrics correlated and the calculated correlation coefficient) is added to the event message and the priority value within the event message is either set or modified (if already set), as described above (block 270). The now enriched event message is then forwarded for further processing by other components within management station 130c (block 270). Such processing may include, for example, causing the enriched event to be displayed to operators or triggering one or more automatic responses by the management station based upon the information in the enriched event message, including any information added or modified as described above. Blocks 254-272 are repeated until an indication to terminate the method is detected (block 272), causing the method to end (block 274).

Figure 3:
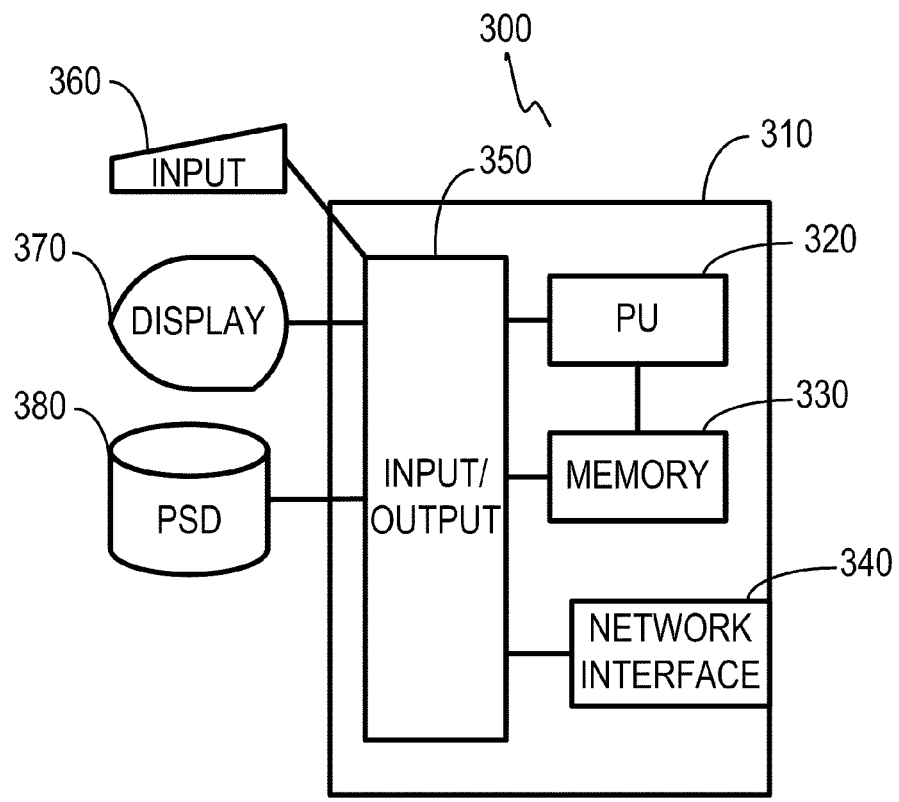
FIG. 3 illustrates an example of a computer system suitable for executing software that performs at least some of the functionality described herein.

Referring now to FIG. 3, an example computer system 300 is shown that may be used as a management station, such as virtual machine 130c of FIG. 1A, or as any other virtual or real computer system shown in the figures and described herein. Example computer system 300 may include a programmable control device 310 which may be optionally connected to input 360 (e.g., a keyboard, mouse, touch screen, etc.), display 370 or non-volatile/persistent storage device (PSD) 380 (sometimes referred to as direct access storage device DASD). Also, included with programmable control device 310 is a network interface 340 for communication via a network with other computing and corporate infrastructure devices (see, e.g., network 102 of FIG. 1A). Note that network interface 340 may be included within programmable control device 310 or be external to programmable control device 310. In either case, programmable control device 310 will be communicatively coupled to network interface 340. Also note that non-volatile storage unit 380 represents any form of non-volatile storage including, but not limited to, all forms of optical, magnetic and solid-state storage elements.

Programmable control device 310 may be included in a computer system and be programmed to perform methods in accordance with this disclosure (e.g., method 250 illustrated in FIG. 2). Programmable control device 310 includes a processing unit (PU) 320, input-output (I/O) interface 350 and memory 330. Processing unit 320 may include any programmable controller device including, for example, processors of an IBM mainframe (such as a quad-core z10 mainframe microprocessor). Alternatively, in non mainframe systems, examples of processing unit 320 include the Intel Core®, Pentium® and Celeron® processor families from Intel and the Cortex® and ARM® processor families from ARM. (IN- TEL CORE, PENTIUM and CELERON are registered trademarks of the Intel Corporation. CORTEX is a registered trademark of the ARM Limited Corporation. ARM is a registered trademark of the ARM Limited Company.) Memory 330 may include one or more memory modules and include random access memory (RAM), read only memory (ROM), programmable read only memory (PROM), programmable read-write memory, and solid state memory. One of ordinary skill in the art will also recognize that PU 320 may also include some internal memory including, for example, cache memory.

In addition, acts in accordance with the method of FIG. 2 may be performed by an example computer system 300 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 102 and/or a wireless link.

As evident from the examples presented, at least some of the functionality described herein (e.g., Data Correlator 135 of FIG. 1A), may be performed on computers implemented as virtualized computer systems (e.g., systems implemented using z/VM virtual machine operating system software by IBM), as well as by distributed computer systems (e.g., diskless workstations and netbooks), just to name two examples. All such implementations and variations of a computer system are contemplated by the present disclosure.

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIG. 2 may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although events and metric data are described as originating, at least in part, from computers such as PCs, mainframes and workstations, other devices or components may also source metric data and/or trigger events. Examples of such devices may include network switches, network routers, disk drives, raid controllers, printers, modems, uninterruptible power supplies and datacenter environmental sensing and control devices. Also, although the embodiments described disclose computing a correlation coefficient based upon a single time window, other suitable correlation coefficient calculations may include the use of more than one time window. It is intended that the following claims be interpreted to include all such variations and modifications.

What is claimed is:

1. A method for enriching events reflecting the state of a plurality of computer systems, the method comprising:
    storing, by a management station, a plurality of event messages and system metric data comprising service metric data, wherein at least one system metric data value triggers an event message of the plurality of event messages;
    determining, by the management station, a degree of correlation between a system metric associated with a system component that triggered the event message and at least one of a plurality of service metrics by calculating a correlation coefficient between the system metric associated with the system component that triggered the event message and at least one of the plurality of service metrics, said degree of correlation based at least in part on the system metric data and the service metric data, wherein the service metrics correspond to service level objectives defined within service level agreements; and
    enriching, by the management station, the event message based at least in part on the degree of correlation and including the calculated correlation coefficient, information for one or more correlated service metrics and a priority value in the event message.

2. The method of claim 1, further comprising:
    receiving, by the management station, the system metric data and externally generated event messages; and
    producing, by the management station, internally generated event messages based at least in part on the system metric data, the plurality of event messages comprising the externally generated event messages or the internally generated event messages.

3. The method of claim 1, further comprising defining, by the management station, a plurality of service metrics for the computer systems based on service level objectives within service level agreements.

4. The method of claim 1, wherein enriching the event message comprises modifying existing information within the event message.

5. The method of claim 4, wherein modifying the existing information comprises modifying the priority value based at least in part on the degree of correlation using the calculated correlation coefficient.

6. The method of claim 1, further comprising identifying subsets of the system and service metric data, used in determining the degree of correlation, within a window of time comprising a time at which an event described by the event message occurred.

7. The method of claim 1, wherein the service metric data comprises service metric data associated with each of the plurality of service metrics.

8. The method of claim 1, further comprising;
    implementing, by the management station, a service model; and identifying, by the management station, the at least one of the plurality of service metrics based at least in part on the service model.

9. A computer-readable storage device comprising computer-readable instructions stored thereon that can be executed on a processing device to cause the processing device to perform the actions of:

storing, by a management station, a plurality of event messages and system metric data comprising service metric data, wherein at least one system metric data value triggers an event message of the plurality of event messages;

determining, by the management station, a degree of correlation between a system metric associated with a system component that triggered the event message and at least one of a plurality of service metrics by calculating a correlation coefficient between the system metric associated with the system component that triggered the event message and at least one of the plurality of service metrics, said degree of correlation based at least in part on the system metric data and the service metric data, wherein the service metrics correspond to service level objectives defined within service level agreements; and enriching, by the management station, the event message based at least in part on the degree of correlation and including the calculated correlation coefficient, information for one or more correlated service metrics and a priority value in the event message.

10. A networked computer system, comprising:

a communication network; and a plurality of computer systems each coupled to the communication network, at least one computer system of the plurality of computer systems comprising:

a storage device that stores a plurality of event messages and system metric data that comprises service metric data, wherein at least one system metric data value triggers an event message of the plurality of event messages; and a processing unit, coupled to the storage device, that determines a degree of correlation between a system metric associated with a system component that triggered the event message and at least one of a plurality of service metrics by calculating a correlation coefficient between the system metric associated with the system component that triggered the event message and at least one of the plurality of service metrics, said degree of correlation based at least in part on the system metric data and the service metric data, wherein the service metrics correspond to service level objectives defined within service level agreements;

wherein the processing unit enriches the event message based at least in part on the degree of correlation and including the calculated correlation coefficient, information for one or more correlated service metrics and a priority value in the event message.

11. The networked computer system of claim 10, the at least one computer system further comprising:

a communication interface, coupled to the processing unit, that receives the system metric data and externally generated event messages from at least one other of the plurality of computer systems;

wherein the processing unit further produces internally generated event messages based at least in part on the system metric data; and wherein the plurality of event messages comprises the externally generated event messages or the internally generated event messages.

12. The computer system of claim 10, wherein the processing unit enriches the event message by modifying existing information within the event message.

13. The computer system of claim 12, wherein modifying the existing information comprises modifying the priority value based at least in part on the degree of correlation using the calculated correlation coefficient.

14. The computer system of claim 10, wherein the processing unit identifies subsets of the system and service metric data, used to determine at least in part the degree of correlation, within a window of time comprising a time at which an event described by the event message occurred.

15. The computer system of claim 10, wherein the service metric data comprises service metric data associated with each of the plurality of service metrics.

16. The computer system of claim 10, wherein the processing unit further implements a service model and wherein the processing unit identifies the at least one service metric based at least in part on the service model.

17. The computer system of claim 10, wherein the processing unit determines the degree of correlation by calculating a Pearson product-moment correlation coefficient.

* * * * *